United States Patent
Kim

(10) Patent No.: US 10,565,834 B2
(45) Date of Patent: Feb. 18, 2020

(54) APPARATUS AND METHOD FOR EMERGENCY RESCUE SERVICE

(71) Applicant: Hyundai Motor Company, Seoul (KR)

(72) Inventor: Young Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/269,340

(22) Filed: Sep. 19, 2016

(65) Prior Publication Data

US 2017/0265049 A1 Sep. 14, 2017

(30) Foreign Application Priority Data

Mar. 9, 2016 (KR) ........................ 10-2016-0028116

(51) Int. Cl.
| | |
|---|---|
| B60Q 1/00 | (2006.01) |
| G08B 3/10 | (2006.01) |
| G08G 1/00 | (2006.01) |
| G08B 25/01 | (2006.01) |
| H04W 4/90 | (2018.01) |
| G07C 5/00 | (2006.01) |

(52) U.S. Cl.
CPC ......... *G08B 3/1016* (2013.01); *G08B 25/016* (2013.01); *G08G 1/205* (2013.01); *H04W 4/90* (2018.02); *G07C 5/008* (2013.01)

(58) Field of Classification Search
CPC ... B60Q 1/52; B60Q 3/00; B60Q 5/00; B60Q 5/005; B60K 31/18; B60K 28/02; B60K 28/00; B60R 16/0232
USPC ....................................................... 340/438
See application file for complete search history.

(56) References Cited

U.S. PATENT DOCUMENTS

| | | | | |
|---|---|---|---|---|
| 6,351,211 | B1* | 2/2002 | Bussard | B60Q 1/44 340/438 |
| 7,129,826 | B2* | 10/2006 | Nitz | B60Q 1/52 340/436 |
| 2008/0001780 | A1* | 1/2008 | Ohno | G08G 1/0962 340/904 |
| 2011/0313617 | A1* | 12/2011 | Omote | B60Q 5/008 701/36 |
| 2013/0070928 | A1* | 3/2013 | Ellis | H04R 25/30 381/56 |
| 2013/0229289 | A1* | 9/2013 | Bensoussan | B60Q 5/006 340/902 |

(Continued)

FOREIGN PATENT DOCUMENTS

| | | |
|---|---|---|
| JP | 2002-288767 A | 10/2002 |
| JP | 2004-251989 A | 9/2004 |
| KR | 10-0655526 B1 | 12/2006 |

(Continued)

*Primary Examiner* — Huy C Ho
(74) *Attorney, Agent, or Firm* — Mintz Levin Cohn Ferris Glovsky and Popeo, P.C.; Peter F. Corless

(57) ABSTRACT

An disclosure apparatus for an emergency rescue service includes: a cluster transmitting an electric warning sound output signal related to information regarding a vehicle; an emergency call unit connected to the cluster so as to receive the electric warning sound output signal from the cluster, and selecting and transmitting one of a plurality of previously stored electric sound sources so as to output an electric sound corresponding to the selected and transmitted electric warning sound output signal; and a speaker outputting the electric sound source selected by the emergency call unit.

12 Claims, 3 Drawing Sheets

(56) References Cited

U.S. PATENT DOCUMENTS

2014/0114555 A1* 4/2014 Lagassey ............... G07C 5/008
　　　　　　　　　　　　　　　　　　　　　701/117

FOREIGN PATENT DOCUMENTS

| KR | 10-1081306 B1 | 11/2011 |
| KR | 2014-0059933 A | 5/2014 |
| KR | 2015-0049097 A | 5/2015 |
| KR | 10-2016-0011073 A | 1/2016 |

* cited by examiner

APPARATUS AND METHOD FOR EMERGENCY RESCUE SERVICE

CROSS-REFERENCE TO RELATED APPLICATION

This application claims under 35 U.S.C. § 119(a) the benefit of and priority to Korean Patent Application No. 10-2016-0028116 filed on Mar. 9, 2016, the entire contents of which are incorporated herein by reference as if fully set forth herein.

BACKGROUND (a) Technical Field

The present disclosure relates generally to an apparatus and method for an emergency rescue service and, more particularly, to an apparatus for an emergency rescue service, in which a speaker, an electric sound device, and a black box are unified, and a method thereof.

(b) Background Art

In general, an emergency call system is a system that transmits information regarding the location, speed, direction, and other information of a vehicle to nearby public safety answering points (PSAPs) when an accident involving the vehicle occurs, so that emergency measures may be rapidly and efficiently taken. Indeed, recent regulations require vehicles to be equipped with such an emergency call (E-call) system.

The emergency call system includes an in-vehicle system (IVS), a mobile network operator (MNO), a PSAP, etc. The IVS directly controls a terminal. The MNO serves as an intermediate connector. The PSAP receives information from an end terminal and processes the same.

The emergency call system can also include an additional unit and a speaker to provide functional features, but the usability thereof is typically limited outside of emergency call purposes. Furthermore, since the additional unit and the speaker of the emergency call system are not frequently used, an operator of the emergency call system can have difficulty in determining whether they are out of order in ordinary times. Thus, a dispute may arise regarding potential malfunctions of the additional unit and the speaker when an accident occurs. Accordingly, it is important to unify the additional functions of the emergency call system, thereby increasing operator convenience.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with related art. It is an object of the present disclosure to provide an apparatus and method for an emergency rescue service, in which information is received from a cluster and used to output electric warning sound using an emergency call unit and a speaker. Further, data for output of the electric warning sound is stored in a designated memory to be used as black box data when an accident occurs, so that the data may be used as evidence when a dispute arises in relation to an accident caused by a defect of a vehicle or a driver's carelessness.

According to embodiments of the present disclosure, an apparatus for an emergency rescue service includes: a cluster transmitting an electric warning sound output signal related to information regarding a vehicle; an emergency call unit connected to the cluster so as to receive the electric warning sound output signal from the cluster, and selecting and transmitting one of a plurality of previously stored electric sound sources so as to output an electric sound corresponding to the selected and transmitted electric warning sound output signal; and a speaker outputting the electric sound source selected by the emergency call unit.

The emergency call unit may include: an information acquirer receiving the electric warning sound output signal, a storage storing the electric warning sound output signal and the plurality of electric sound sources, an output unit transmitting the electric warning sound output signal to the storage allowing the storage to store the electric warning sound output signal, and selecting one of the plurality of electric sound sources stored in the storage so as to output the electric sound corresponding to the electric warning sound output signal, and a sound pressure controller controlling a sound pressure of the electric sound source selected by the output unit and transmitting the electric sound source to the speaker.

The storage may include a first memory storing the plurality of electric sound sources, and a second memory storing the electric warning sound output signal.

The second memory may continuously store electric warning sound output signals obtained by the information acquirer and collect electric vehicle information data to be used as black box information.

The emergency call unit may further include a communication unit transmitting the electric vehicle information data to a call center and outputting a sound of a telephone call to the call center via the speaker when an electric warning sound output signal indicating deployment of an airbag installed in the vehicle is received from the cluster.

The speaker may be integrally coupled to the emergency call unit.

Furthermore, in accordance with embodiments of the present disclosure, a method of an emergency rescue service includes: receiving an electric warning sound output signal related to information regarding a vehicle via an emergency call unit connected to a cluster of the vehicle; storing the received electric warning sound output signal received; selecting an electric sound source by selecting and transmitting one of a plurality of previously stored electric sound sources via the emergency call unit; outputting an electric sound corresponding to the selected and transmitted electric warning sound output signal; and outputting the selected electric sound source via a speaker.

The storing of the electric warning sound output signal may include collecting electric vehicle information data by continuously storing electric warning sound output signals.

The receiving of the electric warning sound output signal may include transmitting the electric vehicle information data to a call center and outputting a sound of a telephone call via the speaker when an electric warning sound output signal indicating deployment of an airbag installed in the vehicle is received from the cluster.

The selecting of the electric sound source may include blocking output of the electric sound source when an electric warning sound output signal indicating deployment of an airbag installed in the vehicle is received from the cluster.

The outputting of the electric sound source may include outputting the electric sound source by controlling a sound pressure of the electric sound source.

The above and other features of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Figure 1:
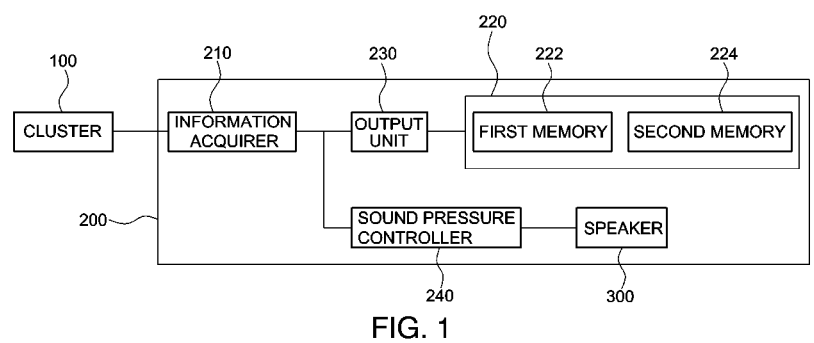
FIG. 1 is a schematic block diagram of an apparatus for an emergency rescue service according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The advantages and features of the present disclosure and a method of achieving them will be clearly understood from the following embodiments, taken in conjunction with the accompanying drawings. However, the present disclosure may be embodied in many different forms and is not limited to embodiments described herein. Rather, these embodiments are provided so that this disclosure will be thorough and complete and will fully convey the concept of the disclosure to those of ordinary skill in the art. The scope of the disclosure is defined by the appended claims In the description of the present disclosure, certain detailed explanations of related art are omitted when it is deemed that they may unnecessarily obscure the essence of the disclosure. In addition, the terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
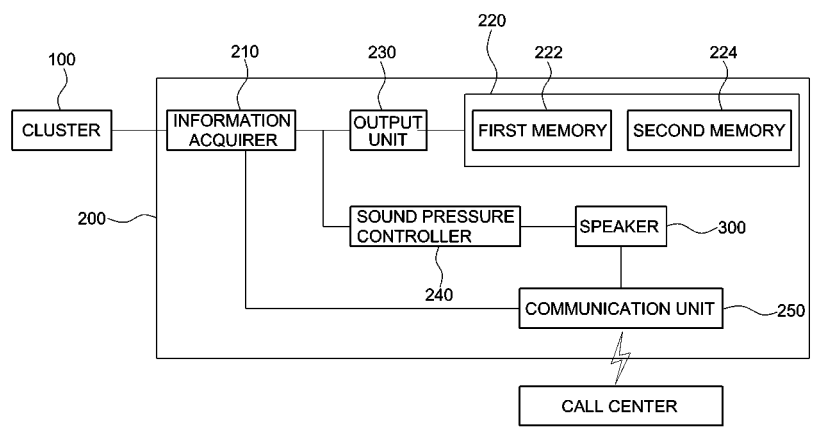
FIG. 2 is a block diagram of a communication unit included in an apparatus for an emergency rescue service according to embodiments of the present disclosure.

Referring now to the presently disclosed embodiments, FIG. 1 is a schematic block diagram of an apparatus for an emergency rescue service according to embodiments of the present disclosure. FIG. 2 is a block diagram of a communication unit included in an apparatus for an emergency rescue service according to embodiments of the present disclosure.

As illustrated in FIG. 1, the apparatus may include a cluster 100, an emergency call unit 200, and a speaker 300.

The cluster 100 may transmit, to the emergency call unit 200, information regarding a state of a vehicle together with information regarding electric warning sound, e.g., emergency light, lane change indicator light, welcome/goodbye sound, seatbelt warning sound, or the like. The cluster 100 may transmit an electric warning sound output signal related to vehicle information to the emergency call unit 200.

The emergency call unit 200 may be connected to the cluster 100 to receive the electric warning sound output signal from the cluster 100, and may select and transmit an electric sound source to output electric sound matching the electric warning sound output signal. To this end, the emergency call unit 200 may include an information acquirer 210, a storage 220, an output unit 230, and a sound pressure controller 240.

The information acquirer 210 may receive an electric warning sound output signal from the cluster 100.

The storage 220 may store the electric warning sound output signal and a plurality of electric sound sources. That is, the storage 220 may store vehicle information that is collected from the cluster 100 in order to output electric sound. The plurality of electric sound sources and the electric warning sound output signal received from the information acquirer 210 may be stored in the storage 220 in the form of data.

The storage 220 may include a first memory 222 that stores a plurality of electric sound sources corresponding to electric warning sound output signals according to vehicle information, and a second memory 224 that stores the electric warning sound output signals.

In this case, the second memory 224 may continuously store and collect electric warning sound output signals obtained by the information acquirer 210. Thus, electric vehicle information data may be collected and used as black box data. Thus, a wider range of information may be stored, compared to an existing black box that stores only camera information, and may be used as evidence when a dispute arises in relation to the cause of an accident, e.g., by a defect of the vehicle or a driver's carelessness.

The output unit 230 may transmit various electric warning sound output signals received from the cluster 100 to the second memory 224 to store the same in the second memory 224. In addition, the output unit 230 may select one of the plurality of electric sound sources stored in the first memory 222 so as to output electric sound matching the electric warning sound output signal.

The sound pressure controller 240 may control the sound pressure of the electric sound source selected by the output unit 230 and transmit the electric sound source to the speaker 300. To this end, the sound pressure controller 240 may include a DC-DC converter that generates an alternating current (AC) of high power capacity from a direct current (DC), converts the AC into AC of a different voltage through a transformer, and rectifies the AC of the different voltage to a DC so as to supply a voltage matching the sound pressure.

The speaker 300 may output an electric sound source selected to correspond to an electric warning sound output signal transmitted from the cluster 100. The speaker 300 may also be integrally coupled to the emergency call unit 200. Thus, a speaker that is separately attached to the cluster 100 may be omitted to reduce manufacturing costs. In addition, the speaker 300 may have advanced features, compared to existing speakers so as to output a minimum sound pressure level satisfying regulations. Thus, the marketability of the apparatus for an emergency rescue service may increase.

According to embodiments of the present disclosure, an electric sound source matching an electric warning sound output signal may be output via the speaker 300 at ordinary times (e.g., during normal operation). Thus, whether the emergency call unit 200 and the speaker 300 are out of order may be determined. Accordingly, problems that may be caused by malfunction of the emergency call unit 200 and the speaker 300 when an accident occurs may be prevented in advance.

As illustrated in FIG. 2, the emergency call unit 200 according to embodiments of the present disclosure may further include a communication unit 250.

When an airbag installed in the vehicle is deployed, the communication unit 250 may transmit electric vehicle information data stored in the second memory 224 to a call center so that the call center may notice a state of the vehicle, and simultaneously, may output sound of a telephone call to the call center via the speaker 300.

In this case, when the sound of the telephone call is output via the speaker 300 as the airbag is deployed, an operation of a microphone installed in the vehicle may be activated. Thus, even in a case in which a driver cannot directly make a telephone call to the call center (e.g., due to an accident), communication may be easily established between the driver and the call center.

Figure 3:
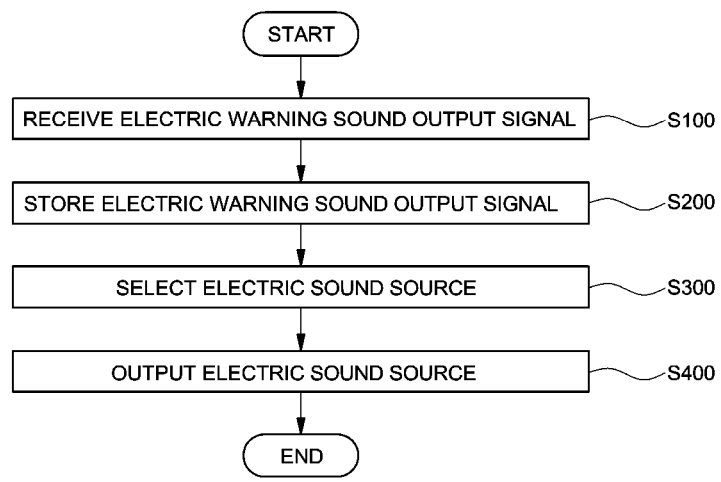
FIG. 3 is a schematic flowchart of a method of an emergency rescue service according to embodiments of the present disclosure.
Figure 4:
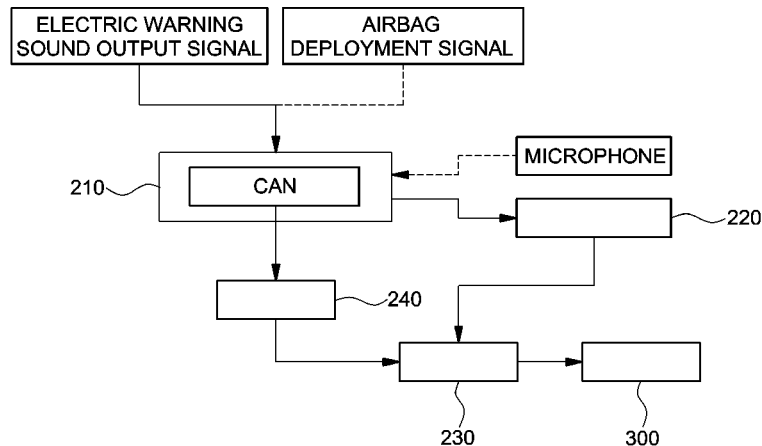
FIG. 4 is a diagram illustrating a method of an emergency rescue service, performed in ordinary times, in accordance with embodiments of the present disclosure.

FIG. 3 is a schematic flowchart of a method of an emergency rescue service according to embodiments of the present disclosure. FIG. 4 is a diagram illustrating a method of an emergency rescue service, performed in ordinary times, in accordance with embodiments of the present disclosure.

As illustrated in FIGS. 3 and 4, in the case of electric warning sound indicating a lane change, upon receiving such electric warning sound output signal from the cluster 100 of a vehicle (operation S100), the information acquirer 210 serving as a control unit may transmit the electric warning sound output signal to the storage 220, that is, the second memory 224, so as to store the signal in the storage 220 (S200). In this case, the information acquirer 210 may receive the electric warning sound output signal from the cluster 100 according to a controller area network (CAN) communication scheme designed to establish communication between a microcontroller and devices in a vehicle without a host computer.

Upon receiving the electric warning sound output signal indicating a lane change from the cluster 100, the information acquirer 210 may transmit the signal to the second memory 224 as described above, and generate a sound pressure control signal through the sound pressure controller 240 to output an electric sound source so as to supply a voltage corresponding to the sound pressure.

In this case, the output unit 230 may select a lane-change electric sound source corresponding to the electric warning sound output signal from the storage 220, particularly, from the first memory 222 (S300) and may transmit the selected electric sound source to the speaker 300 so as to output this source via the speaker 300 (operation S400).

Thus, according to embodiments of the present disclosure, an electric sound source matching an electric warning sound output signal may be output via the speaker 300 in ordinary times. Thus, since whether the emergency call unit 200 and the speaker 300 are out of order (i.e., malfunctioning) may be determined, problems that may be caused by malfunction of the emergency call unit 200 and the speaker 300 when a vehicle accident occurs may be prevented in advance.

Figure 5:
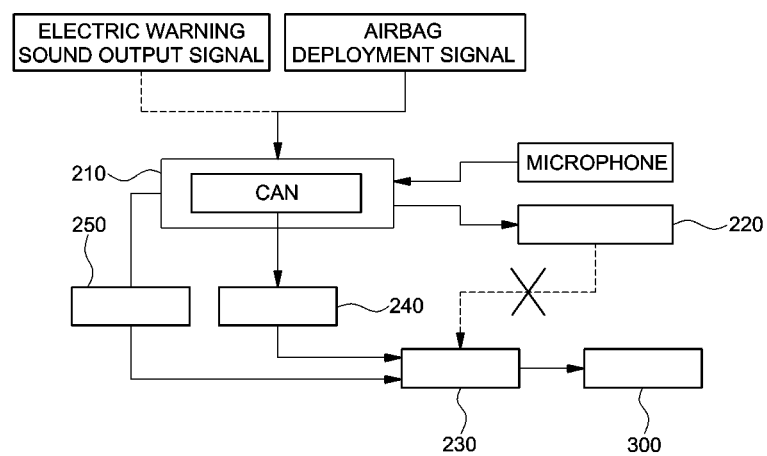
FIG. 5 is a diagram illustrating a method of an emergency rescue service, performed when an accident occurs, in accordance with embodiments of the present disclosure.

FIG. 5 is a diagram illustrating an additional method of an emergency rescue service when an accident occurs in accordance with embodiments of the present disclosure.

As illustrated in FIG. 5, when an electric warning sound output signal regarding airbag deployment is received from the cluster 100, microphone information may be received from a microphone installed in a vehicle and an operation of the microphone is activated, and simultaneously, the signal may be transmitted to the second memory 224 to be stored in the second memory 224.

In this case, the electric warning sound output signal indicating deployment of an airbag installed in the vehicle may be collected and stored in the second memory 224 together with various previous electric warning sound output signals. Thus, when an accident involving the vehicle occurs, a call center may easily learn a state of the vehicle. Furthermore, the electric warning sound output signal may be used as black box data and thus be used as evidence when a dispute occurs.

When the electric warning sound output signal regarding airbag deployment is received as described above, electric vehicle information data stored in the second memory 224 may be transmitted to a call center, and sound of a telephone call to the call center may be output via the speaker 300.

In this case, a voltage corresponding to the sound pressure may be supplied through the sound pressure controller 240 so that appropriate sound pressure for making a telephone call to the call center may be output via the speaker 300. Furthermore, transmission of an electric sound source via the output unit 230 may be blocked so that only sound from the call center may be output via the speaker 300. Thus, the electric sound source may be controlled to be a sound-off state.

Accordingly, according to the present disclosure, when an airbag installed in a vehicle is deployed, information data stored in the vehicle may be transmitted to a call center so that the call center may effectively learn a state of the vehicle, and communication can be established with the call center while an operation of a microphone is activated. Thus, communication may be easily established between a driver of the vehicle and the call center. Accordingly, according to the present disclosure, it is possible to effectively deal with a situation in which the driver of the vehicle cannot make a telephone call to the call center on his or her own.

As is apparent from the above description, according to the present disclosure, information may be received from a cluster and used to output electric warning sound using an emergency call unit and a speaker. Data for transmission of the electric warning sound may be stored in a designated memory to be used as black box data when an accident occurs. Thus, the data may be used as evidence when a dispute arises in relation to the cause of an accident, e.g., by a vehicle defect or the driver's carelessness.

In addition, according to the present disclosure, a speaker that is attached to the cluster may be omitted to reduce manufacturing costs, thereby increasing product marketability.

Furthermore, according to the present disclosure, since the emergency call unit is used at ordinary times (i.e., during normal operation), whether it is out of order may be determined. Thus, problems that may be caused by malfunction of the emergency call unit when an accident occurs may be prevented in advance.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for an emergency rescue service of an emergency call, the apparatus comprising:
    a cluster for transmitting electric warning sound output signals related to information regarding a vehicle together with information indicating an electric warning sound;
    an emergency call unit connected to the cluster so as to receive the electric warning sound output signals from the cluster; and
    a speaker integrally coupled to the emergency call unit for outputting the electric sound source selected by the emergency call unit,
    wherein the emergency call unit comprises a storage for storing the electric warning sound output signals and a plurality of electric sound sources,
    wherein the storage comprises a first memory for storing the plurality of electric sound sources, and a second memory different from the first memory for storing the electric warning sound output signals on a continuous basis as black box data indicating a cause of an accident involving the vehicle in the event that the accident occurs,
    wherein the emergency call unit further includes a communication unit transmitting the electric vehicle information data to a call center, and
    wherein the emergency call unit is configured to select and transmit the electric sound source so as to output the electric sound matching the electric warning sound output signals via the speaker during normal operation to enable a determination of whether the emergency call unit and the speaker are out of order, and the communication unit outputs a sound of the telephone call to a call center via the speaker when an electric warning sound output signal indicating deployment of an airbag installed in the vehicle is received from the cluster.

2. The apparatus of claim 1, wherein the emergency call unit includes:
    an information acquirer receiving the electric warning sound output signals;
    an output unit transmitting the electric warning sound output signals to the storage allowing the storage to store the electric warning sound output signals, and selecting one of the plurality of electric sound sources stored in the storage so as to output the electric sound corresponding to the electric warning sound output signals; and
    a sound pressure controller controlling a sound pressure of the electric sound source selected by the output unit and transmitting the electric sound source to the speaker.

3. The apparatus of claim 2, wherein the second memory continuously stores the electric warning sound output signals obtained by the information acquirer and collects electric vehicle information data to be used as black box information.

4. The apparatus of claim 3, wherein the emergency call unit further includes a communication unit transmitting the electric vehicle information data to a call center and outputting a sound of a telephone call to the call center via the speaker when an electric warning sound output signal indicating deployment of an airbag installed in the vehicle is received from the cluster.

5. The apparatus of claim 1, wherein the speaker is integrally coupled to the emergency call unit.

6. The apparatus of claim 1, wherein the information indicating the electric warning sound indicates at least one of: an emergency light, a lane change indicator light, a welcome sound, a goodbye sound, and a seatbelt warning sound.

7. A method of an emergency rescue service, the method comprising:
    receiving electric warning sound output signals related to information regarding a vehicle together with information indicating an electric warning sound via an emergency call unit connected to a cluster of the vehicle;
    storing the received electric warning sound output signals received;
    selecting an electric sound source by selecting and transmitting one of a plurality of previously stored electric sound sources via the emergency call unit;
    outputting an electric sound corresponding to the selected and transmitted electric warning sound output signals by a speaker integrally coupled to the emergency call unit; and outputting the selected electric sound source via a speaker, wherein the emergency call unit comprises a storage for storing the electric warning sound output signals and a plurality of electric sound sources, wherein the storage comprises a first memory for storing the plurality of electric sound sources, and a second memory different from the first memory for storing the electric warning sound output signals on a continuous basis as black box data indicating a cause of an accident involving the vehicle in the event that the accident occurs, wherein the emergency call unit further includes a communication unit transmitting the electric vehicle information data to a call center, and wherein the emergency call unit is configured to select and transmit the electric sound source so as to output the electric sound matching the electric warning sound output signals via the speaker during normal operation to enable a determination of whether the emergency call unit and the speaker are out of order, and the communication unit outputs a sound of the telephone call to a call center via the speaker when an electric warning sound output signal indicating deployment of an airbag installed in the vehicle is received from the cluster.

8. The method of claim 7, wherein the storing of the electric warning sound output signals comprises collecting electric vehicle information data by continuously storing the electric warning sound output signals.

9. The method of claim 8, wherein the receiving of the electric warning sound output signals comprises transmitting the electric vehicle information data to a call center and outputting a sound of a telephone call via the speaker when an electric warning sound output signal indicating deployment of an airbag installed in the vehicle is received from the cluster.

10. The method of claim 7, wherein the selecting of the electric sound source comprises blocking output of the electric sound source when an electric warning sound output signal indicating deployment of an airbag installed in the vehicle is received from the cluster.

11. The method of claim 7, wherein the outputting of the electric sound source comprises outputting the electric sound source by controlling a sound pressure of the electric sound source.

12. The method of claim 7, wherein the information indicating the electric warning sound indicates at least one of: an emergency light, a lane change indicator light, a welcome sound, a goodbye sound, and a seatbelt warning sound.

* * * * *